US012298890B2

(12) United States Patent
Sakoda et al.

(10) Patent No.: US 12,298,890 B2
(45) Date of Patent: May 13, 2025

(54) GENERATION DEVICE, METHOD OF GENERATION, AND COMPUTER PROGRAM PRODUCT

(71) Applicant: KABUSHIKI KAISHA TOSHIBA, Tokyo (JP)

(72) Inventors: Takeshi Sakoda, Tokyo (JP); Yumiko Sakai, Fujisawa Kanagawa (JP); Tomonori Maegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 17/823,199

(22) Filed: Aug. 30, 2022

(65) Prior Publication Data

US 2023/0141619 A1    May 11, 2023

(30) Foreign Application Priority Data

Nov. 9, 2021   (JP) ................................. 2021-182566

(51) Int. Cl.
  *G06F 11/36*      (2006.01)
  *G06F 11/3668*    (2025.01)
(52) U.S. Cl.
  CPC ...... *G06F 11/3684* (2013.01); *G06F 11/3688* (2013.01); *G06F 11/3692* (2013.01)
(58) Field of Classification Search
  CPC ............. G06F 11/3684; G06F 11/3688; G06F 11/3692
  USPC .................................................. 717/124–133
  See application file for complete search history.

(56) References Cited

U.S. PATENT DOCUMENTS

| | | | |
|---|---|---|---|
| 10,361,944 B2 * | 7/2019 | Chavda ................... H04L 43/50 |
| 10,409,711 B2 * | 9/2019 | Dolby ................. G06F 11/3688 |
| 11,675,691 B2 * | 6/2023 | Sathianarayanan ... G06F 16/955 |
| | | | 717/124 |
| 2005/0166186 A1 | 7/2005 | Cabrera et al. | |

(Continued)

FOREIGN PATENT DOCUMENTS

| | | | |
|---|---|---|---|
| JP | 2005-235094 A | 9/2005 |
| JP | 5008829 B2 | 8/2012 |
| JP | 5379526 B2 | 12/2013 |

(Continued)

OTHER PUBLICATIONS

Zhu et al., "Mining API Usage Examples from Test Code", 2014, IEEE, pp. 301-310. (Year: 2014).*

(Continued)

*Primary Examiner* — Ted T. Vo
(74) *Attorney, Agent, or Firm* — Finnegan, Henderson, Farabow, Garrett & Dunner, LLP

(57) ABSTRACT

According to an embodiment, a generation device includes an analysis unit, a test scenario generation unit, and a test code generation unit. The analysis unit is configured to analyze a definition file that defines a structure of web application programming interface (Web API) and generate structure analysis data of the Web API. The test scenario generation unit is configured to generate test scenario data of the Web API from a test setting file and the structure analysis data. The test setting file including a test type of the Web API and a test item depending on the test type. The test code generation unit is configured to generate test code for testing the Web API based on the test scenario data.

8 Claims, 7 Drawing Sheets

(56) References Cited

U.S. PATENT DOCUMENTS

2021/0216443 A1    7/2021  Park et al.

FOREIGN PATENT DOCUMENTS

| JP | 2014-32535  A | 2/2014 |
| JP | 6724673  B2 | 7/2020 |
| JP | 2021-111367 A | 8/2021 |

OTHER PUBLICATIONS

Wang et al., "Poster: Cloud API Testing", 2017, IEEE, pp. 385-386. (Year: 2017).*

Kuldeep Rana., "Test Scenario", 2020, https://artoftesting.com, 6 pages. (Year: 2020).*

Japan Patent Office, Office Action in JP App. No. 2021-182566, 2 pages, and machine translation, 3 pages (Dec. 24, 2024).

* cited by examiner

FIG.5

```
WEB API PATH<***/authorize>, METHOD<GET>:     ~103
       FLOW INFORMATION<flow>:{
               "auth",
               "login",
               "token"}
       }
 WEB API PATH<***/data>, METHOD<GET>:
 PARAMETER TYPE INFORMATION<integer>:{
               "zero",
               "max",
               "min",
               "string"},
               ...
```

GENERATION DEVICE, METHOD OF GENERATION, AND COMPUTER PROGRAM PRODUCT

CROSS-REFERENCE TO RELATED APPLICATIONS

This application is based upon and claims the benefit of priority from Japanese Patent Application No. 2021-182566, filed on Nov. 9, 2021; the entire contents of which are incorporated herein by reference.

FIELD

Embodiments described herein relate generally to a generation device, a method of generation, and a computer program product.

BACKGROUND

In a web application programming interface (Web API), plurality of parameters are present for each path. For each of the parameters, numerous tests, such as check of upper and lower boundary values and a standard value, are carried out. Developing a test code therefore adds workload to developers in charge of testing, since merely a small change in path and parameters causes a large change and increase of the test. A test code improperly created impairs the quality of the Web API, as the final product, which is a subsequent problem to be solved.

BRIEF DESCRIPTION OF THE DRAWINGS

FIG. 5 is a diagram that illustrates an example test setting file according to a second embodiment;

DETAILED DESCRIPTION

According to an embodiment, a generation device includes an analysis unit, a test scenario generation unit, and a test code generation unit. The analysis unit is configured to analyze a definition file that defines a structure of web application programming interface (Web API) and generate structure analysis data of the Web API. The test scenario generation unit is configured to generate test scenario data of the Web API from a test setting file and the structure analysis data. The test setting file including a test type of the Web API and a test item depending on the test type. The test code generation unit is configured to generate test code for testing the Web API based on the test scenario data.

Embodiments of a generation device, a method of generation, and a computer program will now be described in detail with reference to the accompanying drawings.

First Embodiment

A development flow of a Web API of a first embodiment will now be described.

Figure 1:
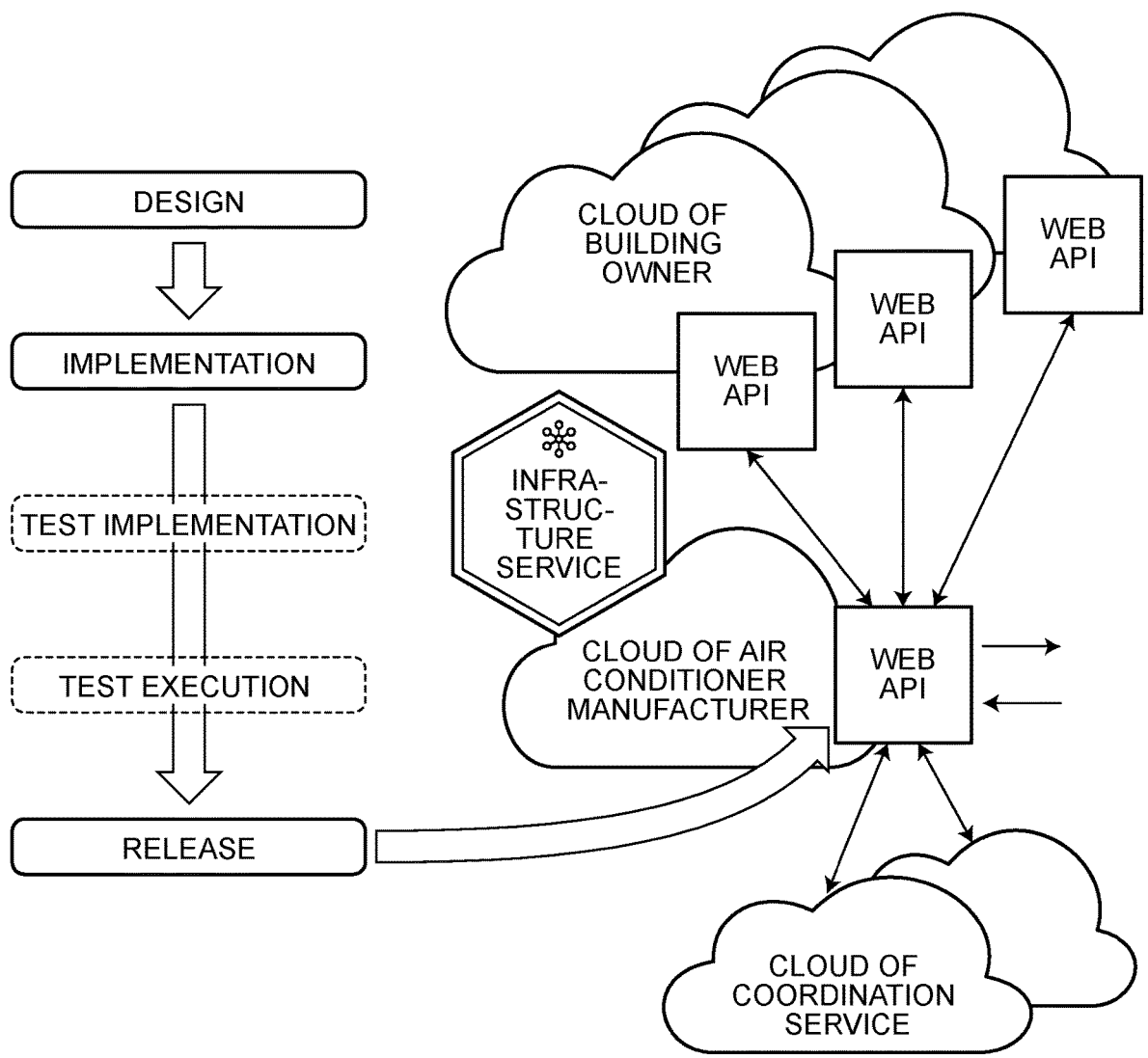
FIG. 1 is an illustrative diagram of a Web API development flow according to a first embodiment.

FIG. 1 is an illustrative diagram of a Web API development flow according to the first embodiment. FIG. 1 illustrates an example flow for developing a Web API for a cloud system used by an air conditioner manufacturer providing infrastructure services. Typically, development of a Web API includes processes of designing the Web API, implementing the Web API, implementing test code of the Web API, and testing the Web API. After testing of the Web API, the Web API is released unless any quality issues are found.

Generating Web API test code requires preparation of a lot of patterns, and adds heavy workload to the developers. For example, conventional automatic test code generation systems can only generate positive tests and part of negative tests of a Web API that can be confirmed using a definition file of a Web API.

A generation device of the first embodiment relates to a device that automatically generates test code of a Web API used in Web API development. The generation device of the first embodiment described later can automate the process of implementing test code, leading to a considerable reduction in the time required for test code development. Furthermore, the test process can be shortened by loading the test code generated by the generation device of the first embodiment to a commercially available or free of charge tool, such as Tavern, that automatically runs a test. The above method can automate the process of creating test code, which is a large part of workload in software development, thereby reducing the workload on the test code developer.

Example Functional Configuration

Figure 2:
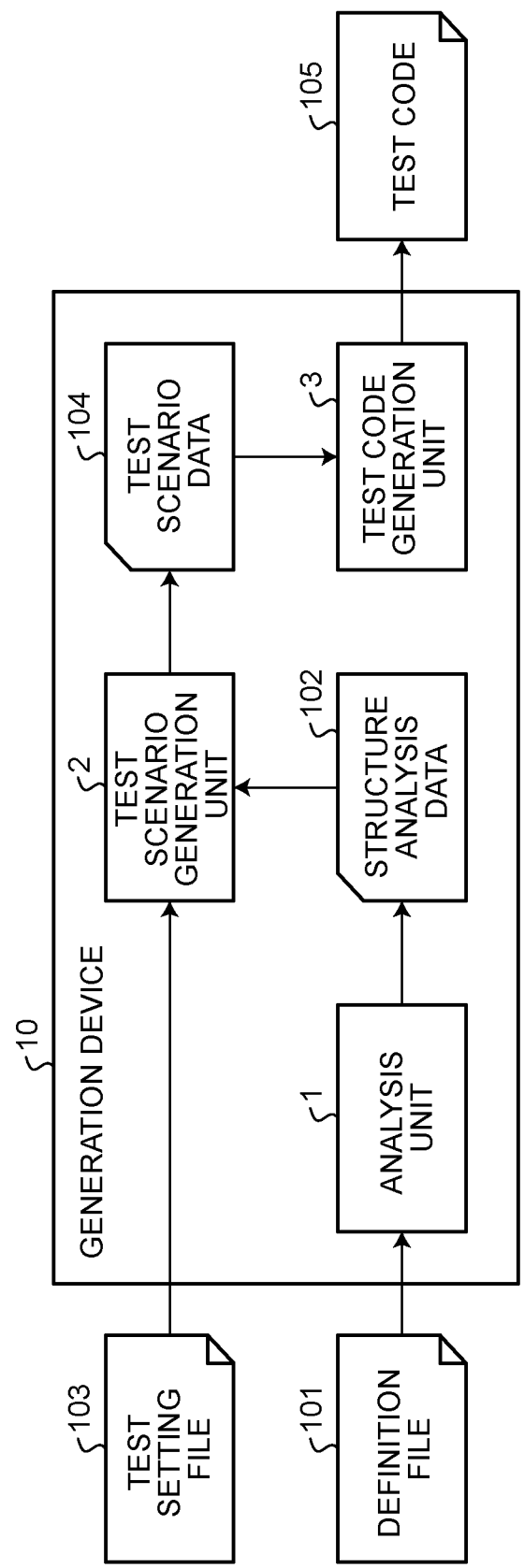
FIG. 2 is a diagram that illustrates an example functional configuration of a generation device according to the first embodiment.

FIG. 2 is a diagram that illustrates an example functional configuration of the generation device according to the first embodiment. A generation device 10 of the first embodiment includes an analysis unit 1, a test scenario generation unit 2, and a test code generation unit 3.

The analysis unit 1 analyzes a definition file 101 that defines the structure of a Web API and generates structure analysis data 102 of the Web API. The definition file 101 includes, for example, source code of the Web API.

The test scenario generation unit 2 generates test scenario data 104 that indicates a test scenario for the Web API, from a test setting file 103, which includes the test type of the Web API and test items for each test type, and the structure analysis data 102. The test scenario data 104 is used to generate test code 105 to be actually run as a program.

The test code generation unit 3 generates the test code 105 for testing the Web API based on the test scenario data 104.

Example Test Setting File

Figure 3:
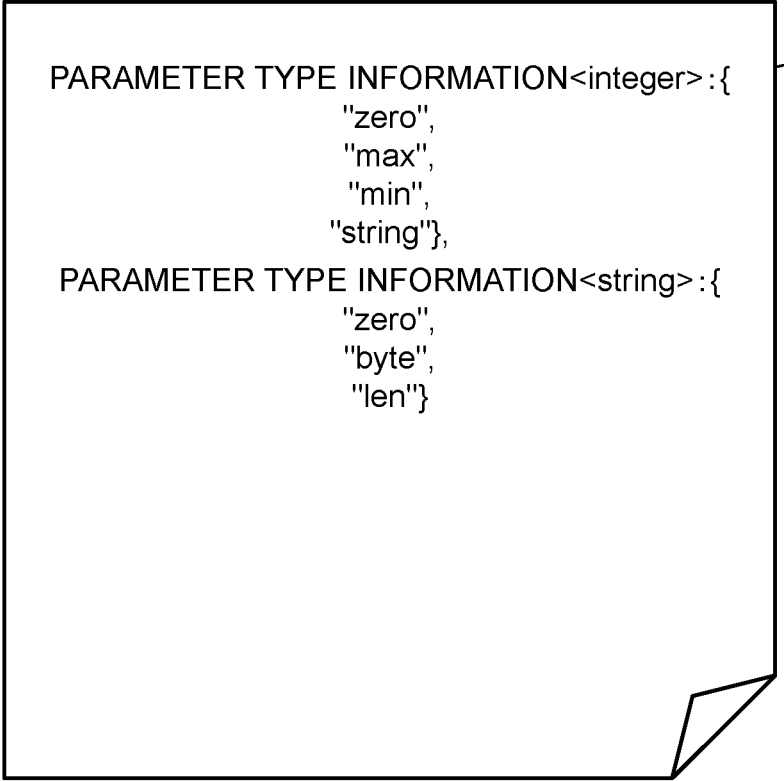
FIG. 3 is a diagram that illustrates an example test setting file according to the first embodiment.

FIG. 3 is a diagram that illustrates an example of the test setting file 103 according to the first embodiment. The test setting file 103 is used to generate the test scenario data 104 to validate the function of the Web API. In the example of FIG. 3, parameter type information (a test type for a parameter type) relating to the parameter of the Web API is a variation of the Web API test type.

The parameter type <integer> includes test items "zero", "max", "min", and "string". The test item "zero" is an item for running a test by assigning 0 (or the null character for the string type) to the parameter. The test item "max" is an item for running a test by assigning the largest value of the parameter to the parameter. The test item "min" is an item for running a test by assigning the smallest value of the parameter to the parameter. The test item "string" is an item for running a test by assigning character string data to the parameter.

The parameter type <string> includes test items "zero", "byte", and "len". The test item "zero" is an item for running a test by assigning the null character (0 for the numeric type) to the parameter. The test item "byte" is an item for running a test by assigning, for example, character string data in double byte code to the parameter. The test item "len" is an item for running a test by assigning, for example, character string data in the largest string length assignable to the parameter.

FIG. 3 is merely an example, and the test items for each parameter type may include items for testing any data, such as the upper limit, the lower limit, a standard value, and an abnormal value according to the parameter type.

Example Method of Generation

Figure 4:
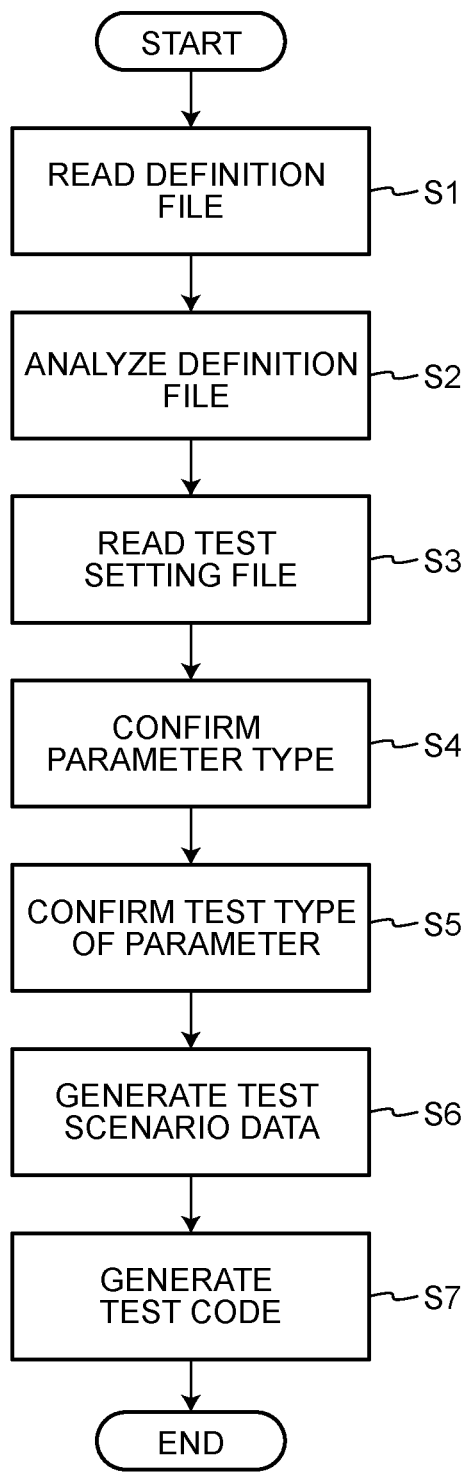
FIG. 4 is a flowchart that illustrates an example method of generation according to the first embodiment.

FIG. 4 is a flowchart that illustrates an example method of generation according to the first embodiment. The analysis unit 1 reads the definition file 101 of the Web API (Step S1). The definition file 101 is created by, for example, a Web API developer. The definition file 101 is written in machine-readable format. The machine-readable format may be any of Open API, web services description language (WSDL), and simple object access protocol (SOAP). For simple explanation, the format is Open API, in this example.

The analysis unit 1 analyzes the definition file 101 (Open API) read at Step S1 (Step S2) and generates the structure analysis data 102 indicating the structure of the Web API. The structure analysis data 102 includes parameter information of the Web API. This structure analysis data 102 is input to the test scenario generation unit 2.

The structure of the Web API includes, for example, path information of the Web API written in Open API, the manner of access for the HTTP method in each path, the parameter name (for example, combination of a path and a method), and the parameter type information (for example, the parameter type such as integer and string).

The test scenario generation unit 2 reads the test setting file 103 (see FIG. 3) (Step S3). The test setting file 103 is written in, for example, domain-specific language (DSL) as a specialized format.

The test scenario generation unit 2 confirms the type of parameter (parameter type) included in the Web API based on the structure analysis data 102 and the test setting file 103 (Step S4). Specifically, the test scenario generation unit 2 confirms the parameter type on each combination of a path and a method, based on the parameter information of the Web API specified by the structure analysis data 102. The test scenario generation unit 2 then matches this parameter type with the parameter type in the test setting file 103.

The test scenario generation unit 2 confirms the test type (test item) of the parameter determined at Step S4 (Step S5). Specifically, on each parameter type matched at Step S4, the test scenario generation unit 2 obtains the test items of the parameter type from the test setting file 103.

The test scenario generation unit 2 generates the test scenario data 104 based on the test items obtained by the processing of Step S5 (Step S6). For example, if the test item is "zero," the test scenario generation unit 2 generates a test scenario for making a query to the server, by assigning a value of "0", more specifically, 0 for the numeric type, and the null character for the string type, to the parameter value of the Web API.

In the last step, the test code generation unit 3 generates the test code 105 to be actually run by a test automated execution tool based on the test scenario data 104 generated by the processing of Step S6 (Step S7).

As explained above, the generation device 10 of the first embodiment can reduce the time required for developing the test code 105 for testing the Web API. Specifically, plurality of parameters are present in one path specific to the Web API, and the definition file 101 of the Web API is not capable of expressing various tests such as check of upper and lower boundary values and a standard value for each parameter. The test code 105 for plurality of parameters present for each combination of a path and a method of the Web API can be automatically generate by the test code generation unit 3 reading test items for each type of parameter (parameter type) included in the test setting file 103, which is defined separately from the definition file 101.

According to the first embodiment, a Web API developer only needs to create the definition file 101 of a Web API complying with the specification, in order to prepare necessary test code. This method is effective in reducing workload of the developer. More specifically, for example, this method allows the developer to easily have wider variety of test items for each parameter type of the Web API, leading to a considerable reduction in the time required for test code development.

Conventionally, it has been difficult to completely automatically generate test code specific to a Web API. For example, a technique that creates a template of test code from the definition file 101 for building a Web API of a workflow document, an interface document, and others, has been used. This method can reduce the workload on the developer in charge of testing. However, this method eventually requires human operation to write code, and therefore a reduction in workload is limited. There is also a technique that automatically runs a subsequent test when a test is finished, and generates new test code for the subsequent test by changing parameters and other elements. This method, however, also needs human operation to write the initial test code.

Second Embodiment

A second embodiment will now be described. In the second embodiment, description similar to that of the first embodiment will be omitted, and parts different from those of the first embodiment will be described.

In the second embodiment, the descriptive form of the test setting file 103 differs from that of the first embodiment. In addition to the definition file 101 of a Web API, a test setting file 103 of the second embodiment is configured to enable output of test code for authentication and authorization in the Web API, an irregular negative test, and others.

In the first embodiment, a test scenario that includes all tests of a value assigned to the parameter of the Web API is generated. With a structure in the second embodiment, such a test item is allowed to be added that includes some steps of the flow (in other words, until failure occurs) of, for example, authentication and authorization processing.

Example Test Setting File

FIG. 5 is a diagram that illustrates an example of the test setting file 103 according to the second embodiment. In the example of FIG. 5, as test types of a Web API, flow information of the Web API (a test type for a flow type) and parameter type information of the Web API (a test type for a parameter type) are included. The test setting file 103 of the second embodiment sets the test type for each combination of a Web API path and a method.

Flow information <flow> includes a path to be tested having test items in the order of "auth", "login" and "token". The test item "auth" is a test item for testing the patterns of success and failure of authentication processing. The test item "login" is a test item for testing the patterns of success and failure of login processing when the authentication processing succeeds. The test item "token" is a test item for testing the patterns of success and failure of token processing when the login processing succeeds.

The flow information <flow> in FIG. 5 is an example, and the flow information may include any test item for confirming the execution sequence of a series of processing included in the flow.

Example Method of Generation

Figure 6:
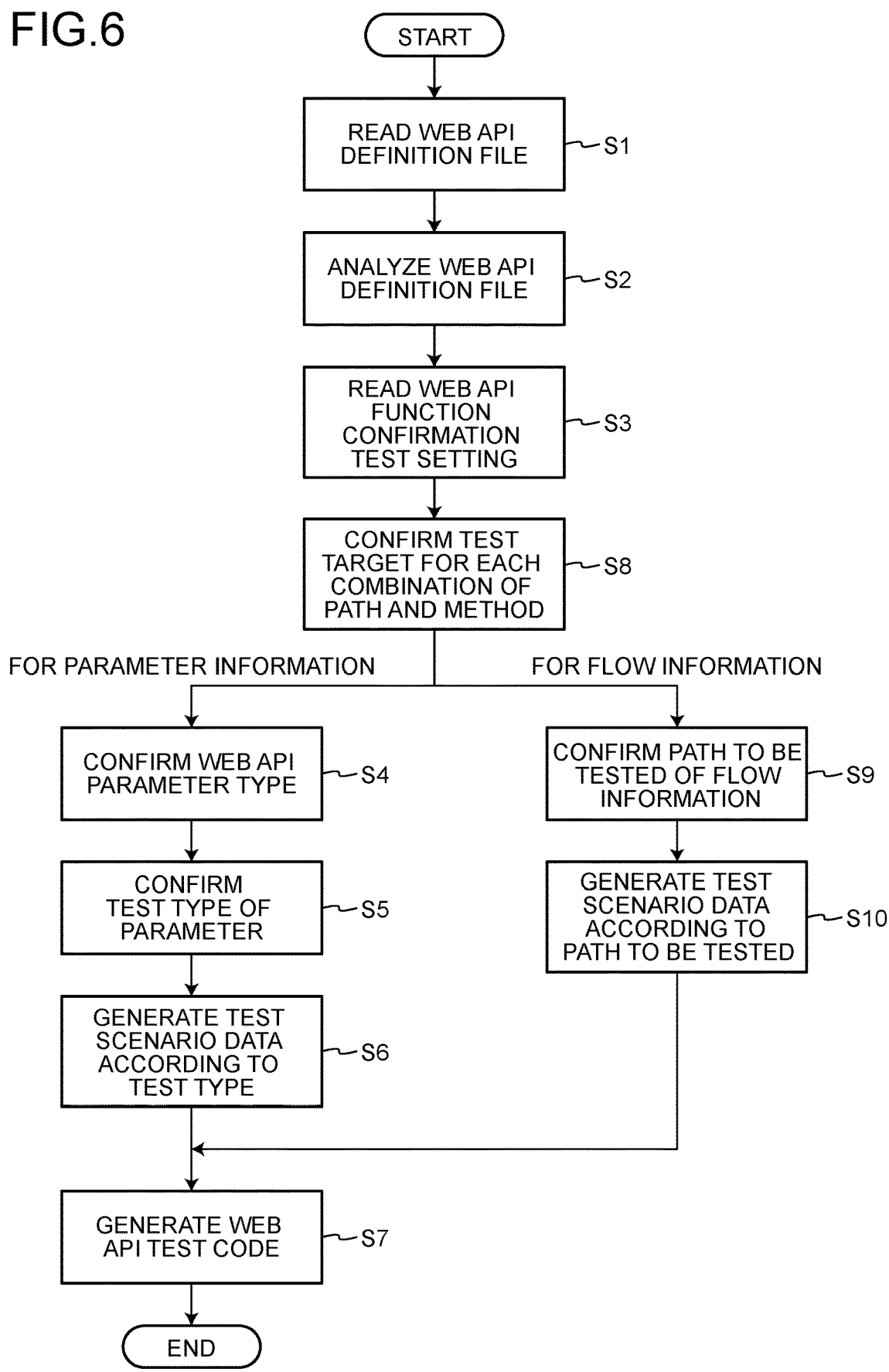
FIG. 6 is a flowchart that illustrates an example method of generation according to the second embodiment.

FIG. 6 is a flowchart that illustrates an example method of generation according to the second embodiment. Since the processing of Steps S1 to S7 is the same as the method of generation of the first embodiment (see FIG. 4), explanation thereof will be omitted. The second embodiment differs from the first embodiment in the content written in the test setting file 103 in that new flow information is added, and Steps S8 to S10 are added to the operation flow.

The generation device 10 performs the same operation as in the first embodiment down to Step S3. The test scenario generation unit 2 determines whether to run the test of parameter information or to run the test of sequential processing (flow information) on each combination of a path and a method included in the test setting file 103 (Step S8).

In the case of running the test of parameter information, the processing moves to Step S4, so that the generation device 10 performs the same processing as that of the first embodiment.

In the case of running the test of flow information, the test scenario generation unit 2 confirms the path to be tested of flow information included in the Web API using the structure analysis data 102 and the test setting file 103 (Step S9). For example, in the example of the test setting file 103 of FIG. 5, the test scenario generation unit 2 acquires the path to be tested in the order of "auth", "login", and "token" included in the flow information <flow>. The test scenario generation unit 2 identifies the flow corresponding to the path to be tested from flow information of the Web API (information indicating the structure of the flow of the Web API) included in the structure analysis data 102.

The test scenario generation unit 2 generates the test scenario data 104 for the path to be tested (Step S10). For example, in the example of the test setting file 103 of FIG. 5, the test scenario generation unit 2 adds the following first through fourth test scenarios to the test scenario data 104.

The first test scenario is a test scenario in which authentication processing of the test item "auth" fails.

The second test scenario is a scenario in which the authentication processing of the test item "auth" succeeds while the authentication processing of the test item "login" fails.

The third test scenario is a scenario in which the authentication processing of the test item "auth" succeeds, the test item "login" succeeds, and the test item "login" fails.

The fourth test scenario is a scenario in which the authentication processing of the test item "auth" succeeds, the test item "login" succeeds, and the test item "login" succeeds.

After the processing of Step S10, the processing moves to Step S7, and the same processing as that of the first embodiment is performed.

As explained above, the second embodiment is adoptable to a test in which another Web API is necessarily used in order to execute the target Web API. For example, as in the case of testing a Web API requiring authentication and authorization, testing plurality of target paths is needed according to the manner of authorization. For such a case, the second embodiment allows for sequentially running a test on each path and thus is effective in reducing the workload on the developer creating the test. This method therefore can considerably reduce the time conventionally required for test code development.

Example hardware configuration of the generation device 10 of the first and the second embodiments will now be described.

Example Hardware Configuration

Figure 7:
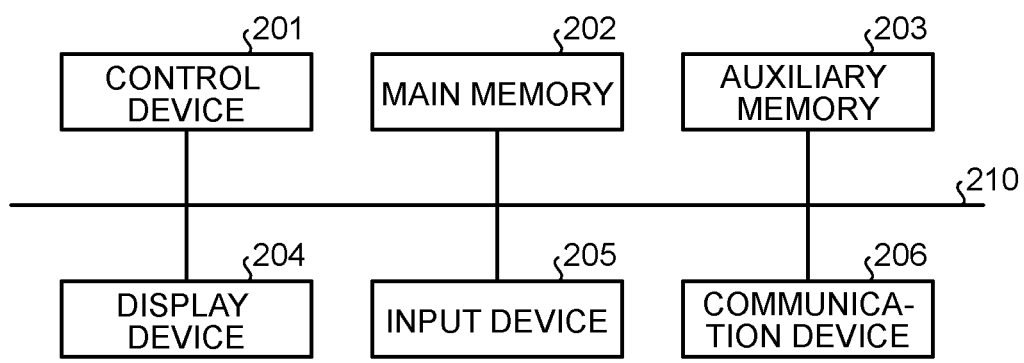
FIG. 7 is a diagram that illustrates an example hardware configuration of the generation device according to the first and the second embodiments.

FIG. 7 is a diagram that illustrates an example hardware configuration of the generation device 10 according to the first and the second embodiments. The generation device 10 in the first and the second embodiments includes a control device 201, a main memory 202, an auxiliary memory 203, a display device 204, an input device 205, and a communication device 206. The control device 201, the main memory 202, the auxiliary memory 203, the display device 204, the input device 205, and the communication device 206 are connected via a bus 210.

Some of the above units of the generation device 10 according to the first and the second embodiments may be omitted. For example, if the generation device 10 is capable of using input and display functions of an external device, the generation device 10 may include neither display device 204 nor input device 205.

The control device 201 executes a computer program loaded in the main memory 202 from the auxiliary memory 203. The main memory 202 is a memory such as a ROM and a RAM. The auxiliary memory 203 is a hard disk drive (HDD), a memory card, or similar devices.

The display device 204 is, for example, a liquid crystal display. The input device 205 is an interface for operating an access point 20. The display device 204 and the input device 205 may be implemented as a touch screen or the like having display and input functions. The communication device 206 is an interface for communicating with other devices.

A computer program to be executed by the generation device 10 is provided as a computer program product by being recorded on a computer-readable storage medium, such as a CD-ROM, a memory card, a CD-R, and a DVD, in an installable or executable file.

The computer program to be executed by the generation device 10 may be stored in a computer connected to a network, such as the Internet, and provided by being downloaded via the network. The computer program to be executed by the generation device 10 may be provided via a network such as the Internet without being downloaded.

The computer program of the generation device 10 may be embedded in a ROM or the like and provided.

The computer program to be executed by the generation device 10 is configured as a module including some functions implementable by a computer program in the functional configuration of FIG. 2 described earlier. As actual hardware, the control device 201 reads the computer program from a storage medium and executes the computer program to load each functional block onto the main memory 202. In other words, each of the above functional blocks is generated on the main memory 202.

Some of or all of the functions in FIG. 2 may be implemented by hardware such as IC, instead of software.

When the functions are implemented by plurality of processors, each processor may implement one of the functions or two or more functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A generation device comprising:
an analysis unit configured to analyze a definition file that defines a structure of web application programming interface (Web API) and generate structure analysis data of the Web API;
a test scenario generation unit configured to generate test scenario data of the Web API from a test setting file and the structure analysis data, the test setting file including a test type of the Web API and a test item depending on the test type; and
a test code generation unit configured to generate test code for testing the Web API based on the test scenario data,
wherein
the structure analysis data includes parameter information of the Web API;
the test type includes a parameter type of the Web API;
the test item depending on the parameter type includes at least one of an upper limit, a lower limit, a standard value, and an abnormal value according to the parameter type; and
the test scenario generation unit generates test scenario data in which a parameter specified from the parameter information of the Web API is tested, as a test item depending on the parameter type, at least for one of the upper limit, the lower limit, the standard value, and the abnormal value according to the parameter type.

2. The device according to claim 1, wherein
the structure analysis data includes flow information of the Web API;
the test type includes a flow type of the Web API; and
the test scenario generation unit generates test scenario data in which a flow specified from the structure analysis data of the Web API is tested with a test item depending on the flow type.

3. The device according to claim 2, wherein the test item depending on the flow type includes a test for confirming an execution sequence of a series of processing included in the flow.

4. The device according to claim 1, wherein the definition file is written in machine-readable format.

5. The device according to claim 4, wherein the machine-readable format includes OpenAPI, Web Services Description Language (WSDL), and Simple Object Access Protocol (SOAP).

6. The device according to claim 1, wherein the test setting file is written in Domain-Specific Language (DSL).

7. A method of generation implemented by a computer, the method comprising:
analyzing a definition file that defines a structure of web application programming Interface (Web API) and generating structure analysis data of the Web API, with a generation device;
generating test scenario data of the Web API from a test setting file and the structure analysis data, with the generation device, the test setting file including a test type of the Web API and a test item depending on the test type; and
generating test code for testing the Web API based on the test scenario data, with the generation device,
wherein
the structure analysis data includes parameter information of the Web API;
the test type includes a parameter type of the Web API;
the test item depending on the parameter type includes at least one of an upper limit, a lower limit, a standard value, and an abnormal value according to the parameter type; and
generating of the test scenario data includes generating test scenario data in which a parameter specified from the parameter information of the Web API is tested, as a test item depending on the parameter type, at least for one of the upper limit, the lower limit, the standard value, and the abnormal value according to the parameter type.

8. A computer program product comprising a non-transitory computer-readable medium including programmed instructions stored therein, the instructions causing a computer to function as:
an analysis unit that analyzes a definition file that defines a structure of web application programming interface (Web API) and generates structure analysis data of the Web API;
a test scenario generation unit that generates test scenario data of the Web API from a test setting file and the structure analysis data, the test setting file including a test type of the Web API and a test item depending on the test type; and
a test code generation unit that generates test code for testing the Web API based on the test scenario data,
wherein
the structure analysis data includes parameter information of the Web API;
the test type includes a parameter type of the Web API;
the test item depending on the parameter type includes at least one of an upper limit, a lower limit, a standard value, and an abnormal value according to the parameter type; and
the test scenario generation unit generates test scenario data in which a parameter specified from the parameter information of the Web API is tested, as a test item depending on the parameter type, at least for one of the upper limit, the lower limit, the standard value, and the abnormal value according to the parameter type.

* * * * *